(12) United States Patent
Chang et al.

(10) Patent No.: US 12,504,280 B2
(45) Date of Patent: Dec. 23, 2025

(54) TANK WALL THICKNESS INSPECTING MODULE

(71) Applicant: Droxo Technology Co., Ltd., Tainan (TW)

(72) Inventors: Wei-Ting Chang, Tainan (TW); Po-Ting Lin, Tainan (TW); Tien-En Lin, Tainan (TW); Cheng-Han Hsieh, Tainan (TW); Chun-Lin Liu, Tainan (TW); Cheng-Hung Shih, Tainan (TW); Yi-Ting Lin, Tainan (TW)

(73) Assignee: DROXO TECHNOLOGY CO., LTD., Tainan (TW)

( * ) Notice: Subject to any disclaimer, the term of this patent is extended or adjusted under 35 U.S.C. 154(b) by 300 days.

(21) Appl. No.: 18/388,397

(22) Filed: Nov. 9, 2023

(65) Prior Publication Data
US 2025/0155238 A1 May 15, 2025

(51) Int. Cl.
*G01B 17/02* (2006.01)
*G01N 29/22* (2006.01)

(52) U.S. Cl.
CPC .......... *G01B 17/02* (2013.01); *G01N 29/221* (2013.01); *G01N 2291/02854* (2013.01)

(58) Field of Classification Search
CPC .... G01B 17/02; G01N 29/221; G01N 29/225; G01N 29/265; G01N 2291/02854
See application file for complete search history.

(56) References Cited

U.S. PATENT DOCUMENTS

| 4,899,437 A | * | 2/1990 | Ozawa | F16D 3/2055 29/787 |
| 5,929,349 A | | 7/1999 | Bass et al. | |

FOREIGN PATENT DOCUMENTS

| CN | 104422411 A | * | 3/2015 | ............. G01B 17/02 |
| CN | 110793449 A | * | 2/2020 | ............. B65G 15/56 |
| CN | 218179916 U | | 12/2022 | |
| CN | 219417450 U | * | 7/2023 | |
| CN | 116576753 A | | 8/2023 | |
| CN | 117433462 A | * | 1/2024 | ............. G01B 17/02 |
| WO | WO-0055594 A2 | * | 9/2000 | ............. G01B 17/02 |

* cited by examiner

*Primary Examiner* — Octavia Hollington
(74) *Attorney, Agent, or Firm* — Birch, Stewart, Kolasch & Birch, LLP

(57) ABSTRACT

A tank wall thickness inspecting module includes a base mount, two guide rails parallel extending from the base mount, a slide slidably connected with the two guide rails, an actuator disposed between the base mount and the slide to drive the slide to move along the two guide rails, a posture-adjustable seat having two guide holes through which the two guide rails extend, a buffer device disposed between the slide and the posture-adjustable seat to enable that the posture-adjustable seat changes a distance and an angle relative to the slide, and a probe disposed with the posture-adjustable seat and provided with a detection surface. The detection surface is flush with or protrudes out of a bottom surface of the posture-adjustable seat. As a result, the angle of the probe can be automatically adjusted based on the surface under inspection.

11 Claims, 7 Drawing Sheets

TANK WALL THICKNESS INSPECTING MODULE

BACKGROUND OF THE INVENTION

1. Field of the Invention

The present invention relates generally to inspecting devices and more particularly, to a module for inspecting the wall thickness of a tank.

2. Description of the Related Art

In the petrochemical or electronics industry, numerous tanks are used to store raw materials. Some of these materials, due to their corrosive nature, may gradually erode the interior of the tanks. Additionally, exposure to sunlight and rain may lead to gradual corrosion of the exterior of the tanks. Therefore, it is necessary to regularly inspect the wall thickness of these tanks to prevent material leakage or workplace incidents due to damages of the tanks. Currently, manual ultrasonic probes are commonly used to detect tank wall thickness. Because the tanks usually have large surface areas and considerable heights, performing manual inspection will always be a challenged task. As such, the manual inspection is often to be performed by the way of sampling inspection, resulting in poor comprehensiveness. As a solution, the industry has been developing unmanned inspection vehicles that can be programmed to follow specific inspection paths, allowing for more comprehensive sampling inspection.

However, the tank surfaces often exhibit irregularities due to pressure or corrosion. As the probe of an unmanned inspection vehicle cannot adjust its posture in accordance with the irregular surfaces, the detected values may become inaccurate or unattainable. Ironically, these irregular surfaces are usually the weak places where the wall thicknesses are the thinnest and most susceptible to damage, and thus requiring precise inspection. Therefore, finding a way to accurately perform inspection of tank wall thickness becomes a challenge to be solved in the industry.

SUMMARY OF THE INVENTION

The present invention has been accomplished in view of the above-noted circumstances. It is an objective of the present invention to provide a tank wall inspecting module, which can automatically adjust the angle of its probe based on the surface under inspection, thereby ensuring that the detection surface of the probe can be positively in contact with the surface under inspection so as to obtain an accurate wall thickness value.

To attain the above-mentioned objective and other objectives, the present invention provides a tank wall thickness inspecting module comprising a base mount, two guide rails, a slide, an actuator, a posture-adjustable seat, a buffer device, and a probe. The two guide rails extend from the base mount and are parallel to each other. The slide is slidably connected with the two guide rails. The actuator includes two ends respectively connected with the base mount and the slide to drive the slide to move along the two guide rails. The posture-adjustable seat includes two guide holes, through which the two guide rails extend. The buffer device is disposed between the slide and the posture-adjustable seat to enable that the posture-adjustable seat changes its distance and angle relative to the slide. The probe is disposed with the posture-adjustable seat and provided with a detection surface, which is flush with a bottom surface of the posture-adjustable seat or protrudes out of the bottom surface of the posture-adjustable seat. In this way, the angle of the probe of the tank wall thickness inspecting module can be automatically adjusted based on the surface under inspection, ensuring that the detection surface of the probe can be positively contacted on the surface under inspection so as to obtain an accurate wall thickness value.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
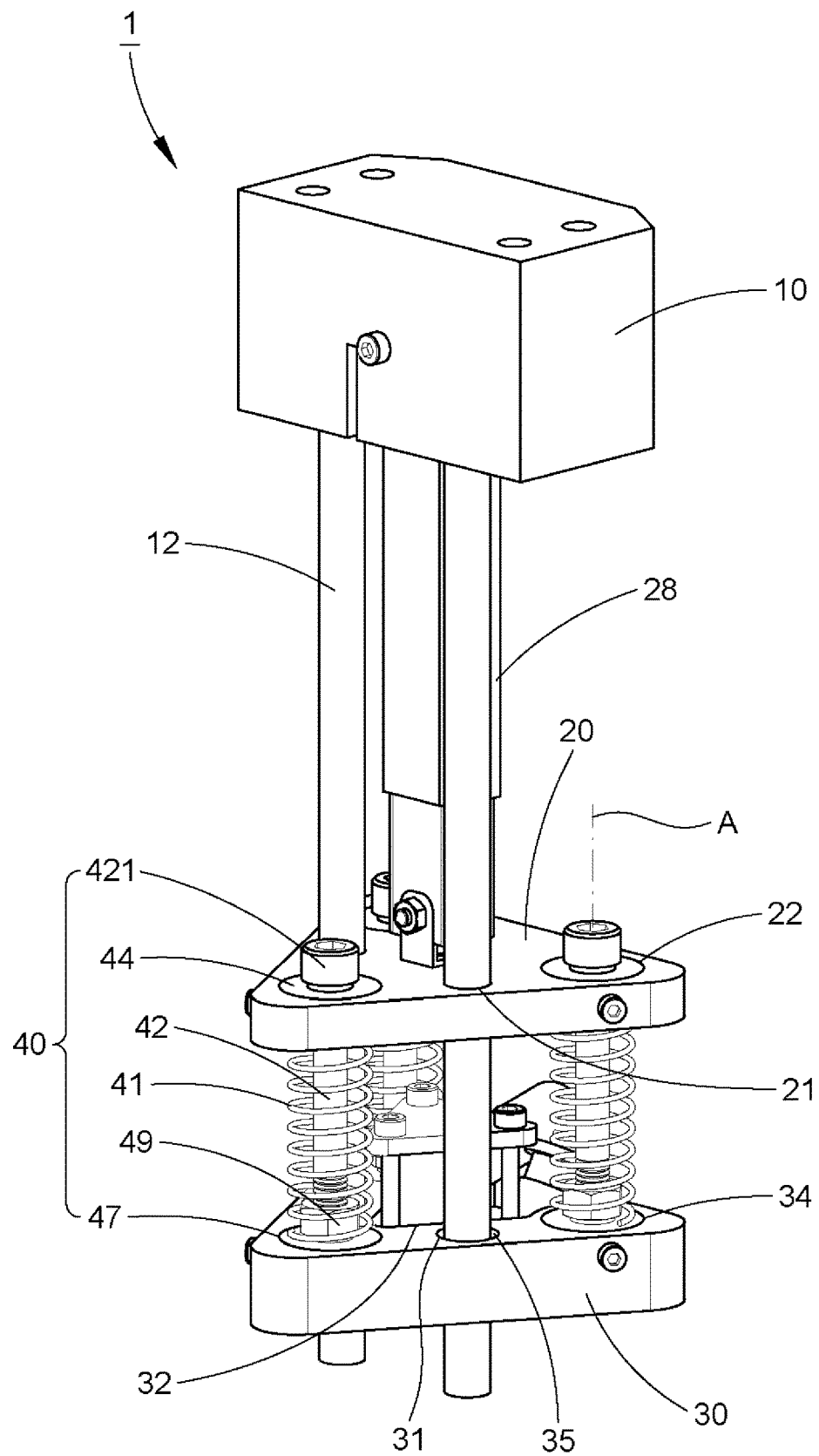
FIG. 1 is a perspective view of a tank wall thickness inspecting module according to an embodiment of the present invention.
Figure 2:
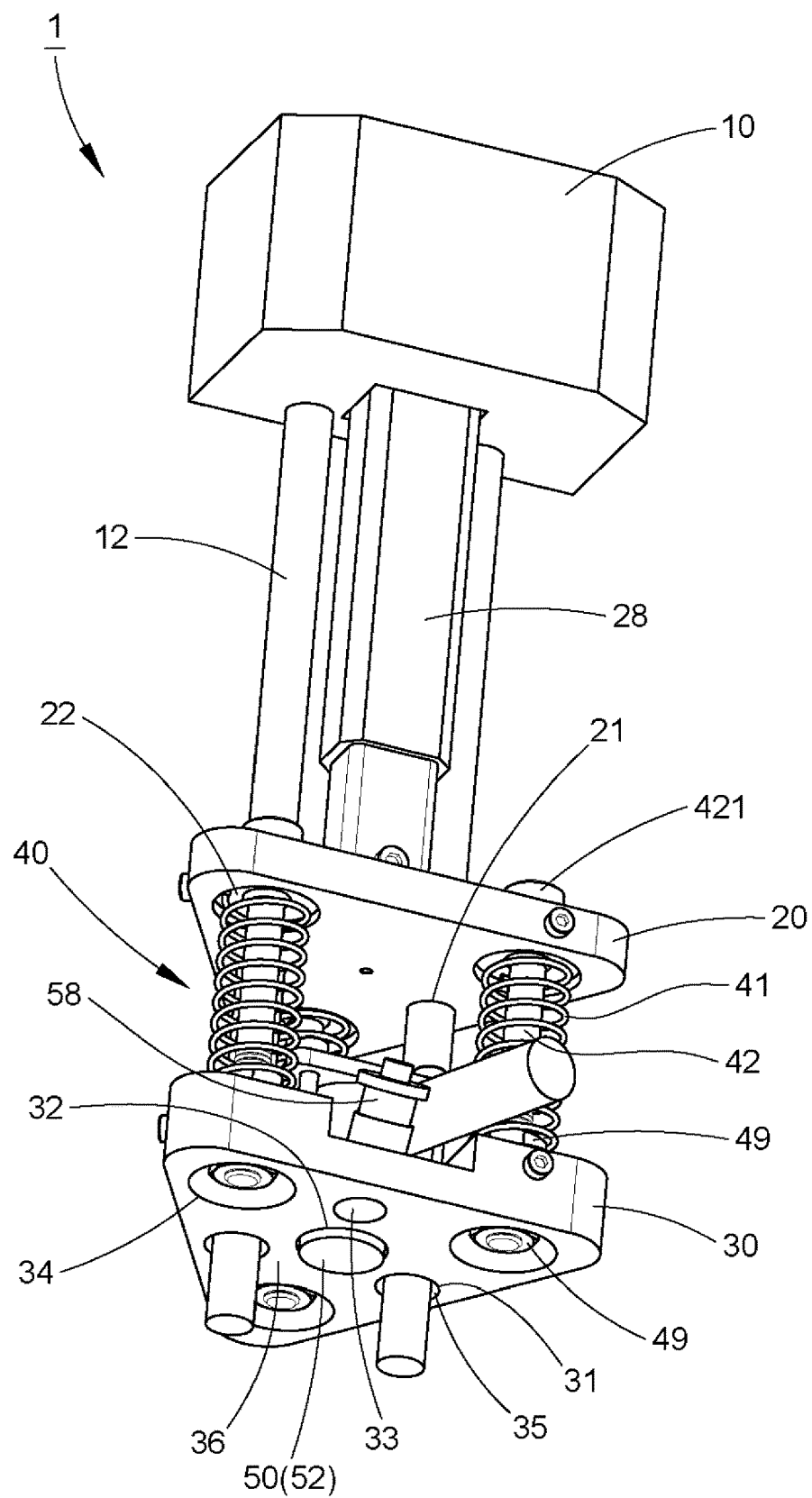
FIG. 2 is another perspective view of the tank wall thickness inspecting module of the embodiment of the present invention.
Figure 3:
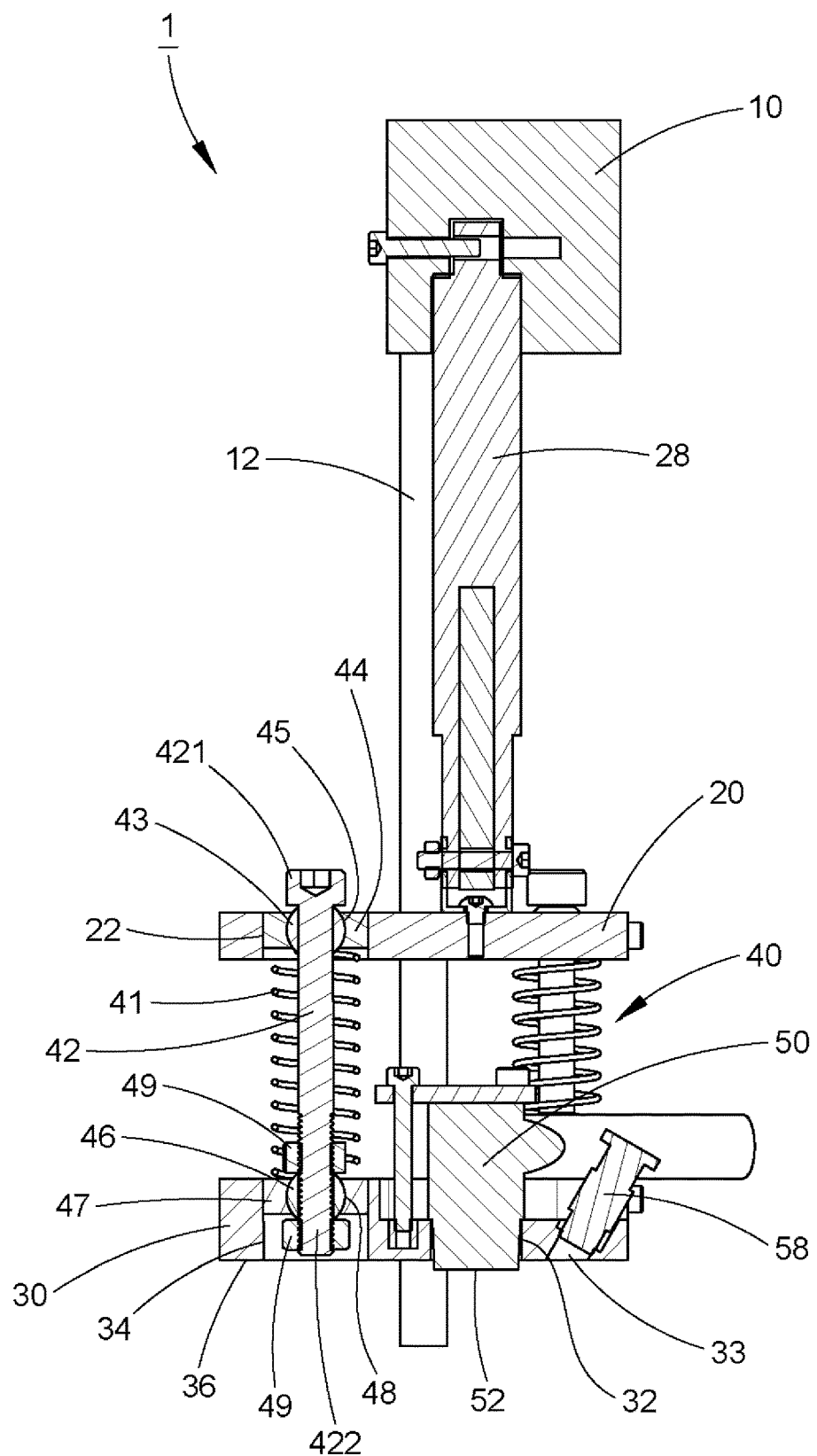
FIG. 3 is a cross-sectional view of the tank wall thickness inspecting module of the embodiment of the present invention.

Hereunder an embodiment will be detailedly described with accompanying drawings for illustrating technical features and structure of the present invention. As shown in FIGS. 1-3, a tank wall thickness inspecting module 1, provided in accordance with a preferred embodiment of the present invention, comprises a base mount 10, two guide rails 12, a slide 20, an actuator 28, a posture-adjustable seat 30, a buffer device 40, a probe 50, and a nozzle 58.

The base mount 10 is used to be installed on a vehicle (not shown), such as an unmanned inspection vehicle. Alternatively, the base mount 10 may be configured as being a part of the vehicle for the installation of the two guide rails 12 and the actuator 28.

The two guide rails 12 are two cylindrical rods extending downward from the base mount 10 and being parallel to each other.

The slide 20 is slidably connected with the two guide rails 12. Specifically, the slide 20 is substantially formed of a triangular plate, which has two through holes 21, through which the two guide rails 12 respectively pass, and three first accommodating holes 22 located at the three corners of the slide 20.

The actuator 28 has two ends connected with the base mount 10 and the slide 20 respectively, to drive the slide 20 to move along the two guide rails 12. For the actuator 28, an electric cylinder, pneumatic cylinder, hydraulic cylinder, or other linear actuators may be used.

The posture-adjustable seat 30 is shaped like a triangular plate and provided with two guide holes 31, through which the two guide rails 12 extend, a mounting hole 32 at a center thereof, an inclined hole 33 neighbored to the mounting hole 32, and three second accommodating holes 34 located at the three corners. The guide rails 12 and the posture-adjustable seat 30 are configured as having a gap 35 left between each guide hole 31 and associated guide rail 12, allowing the posture-adjustable seat 30 to change its angle relative to the two guide rails 12 within a predetermined range.

The buffer device 40 is disposed between the slide 20 and the posture-adjustable seat 30, allowing the posture-adjustable seat 30 to change its distance and orientation angle relative to the slide 20. Specifically, the buffer device 40 comprises three elastic members 41 and three shafts 42 passing through the elastic members 41, respectively. Each elastic member 41 has two ends connected with the slide 20 and the posture-adjustable seat 30, respectively. Each shaft 42 is connected with the slide 20 via a first universal joint 43 and to the posture-adjustable seat 30 via a second universal joint 46. Each first universal joint 43 is sleeved on its our periphery with a first bushing 44, and each second universal joint 46 is sleeved on its outer periphery with a second bushing 47. The first bushings 44 are inserted into the first accommodating holes 22 of the slide 20 respectively, and the second bushings 47 are inserted into the second accommodating holes 34 of the posture-adjustable seat 30 respectively. Each first bushing 44 has an inner wall with a first ball engagement surface 45 contacted with the outer periphery of the first universal joint 43, allowing the first universal joint 43 to rotate relative to the first bushing 44. Similarly, each second bushing 47 has an inner wall with a second ball engagement surface 48 contacted with the outer periphery of the second universal joint 46, allowing the second universal joint 46 to rotate relative to the second bushing 47. The top of each shaft 42 has a stop portion 421 stopped against the top side of the associated first universal joint 43 to prevent the shaft 42 from downward escape from the associated first universal joint 43. Additionally, the lower section 422 of each shaft 42 is externally threaded with two nuts 49 in such a way that the associated second universal joint 46 is clamped and sandwiched between the two nuts 49, thereby preventing the shaft 42 from moving relative to the associated second universal joint 46. In this way, each shaft 42 can move along the axial direction A relative to the associated first universal joint 43.

The probe 50 is partially mounted in the mounting hole 32 of the posture-adjustable seat 30 in such a way that the probe 50 has a detection surface 52 slightly protruding out of the bottom surface 36 of the posture-adjustable seat 30. In another embodiment, the detection surface 52 may be flush with the bottom surface 36. In this embodiment, the probe 50 utilizes the ultrasonic technology to detect the wall thickness.

The nozzle 58 is mounted to the posture-adjustable seat 30 and located adjacent to the probe 50. Specifically, the nozzle 58 is partially mounted in the inclined hole 33 in such a way that the extension direction of the nozzle 58 passes beneath the probe 50. The nozzle 58 sprays water or other liquid towards the desired detection area to be detected by the probe 50, thereby enhancing the detection efficiency of the probe 50.

Figure 4:
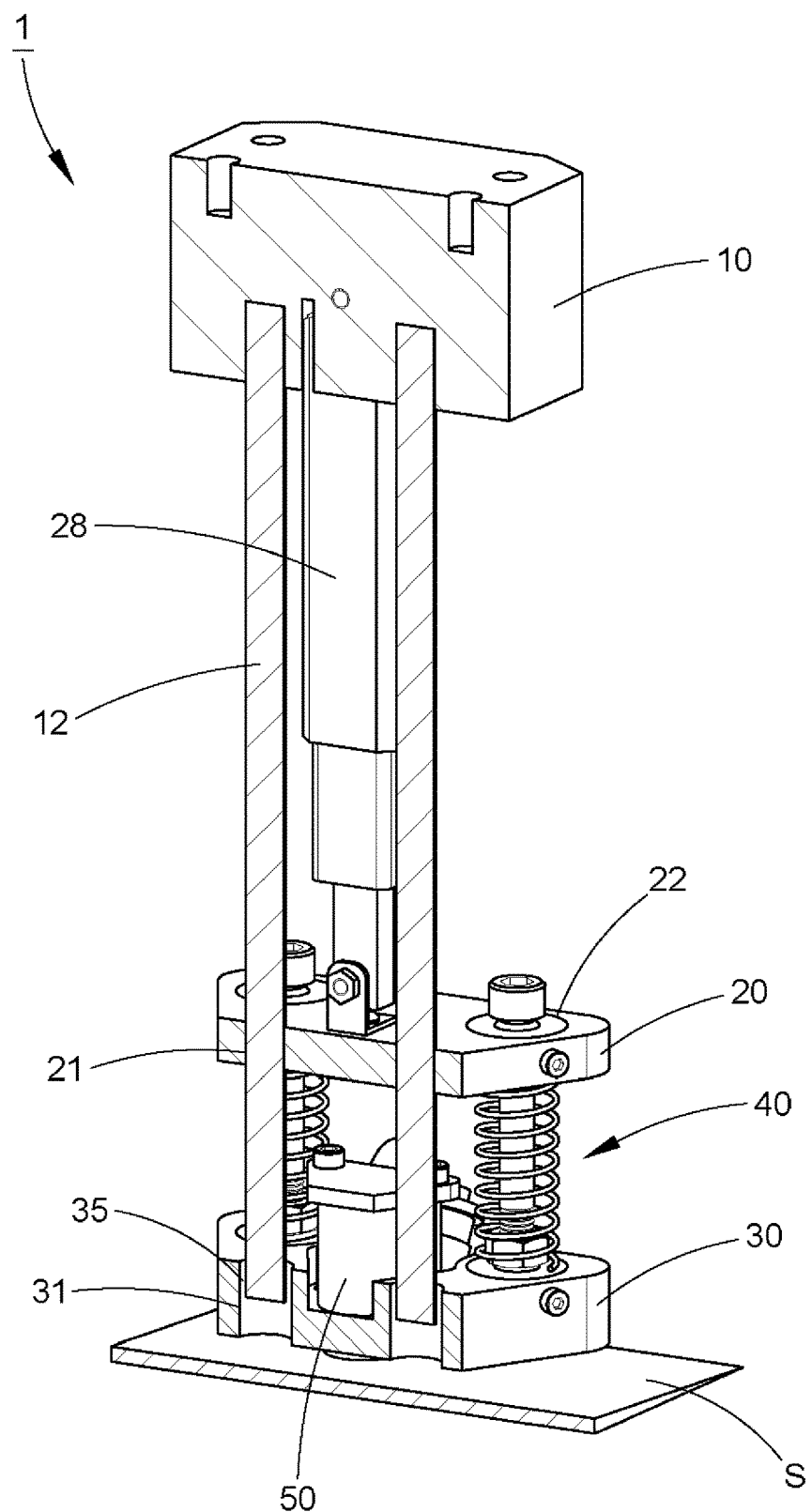
FIGS. 4-7 are schematic views showing the tank wall thickness inspecting module of the embodiment of the present invention in various states of operation.
Figure 5:
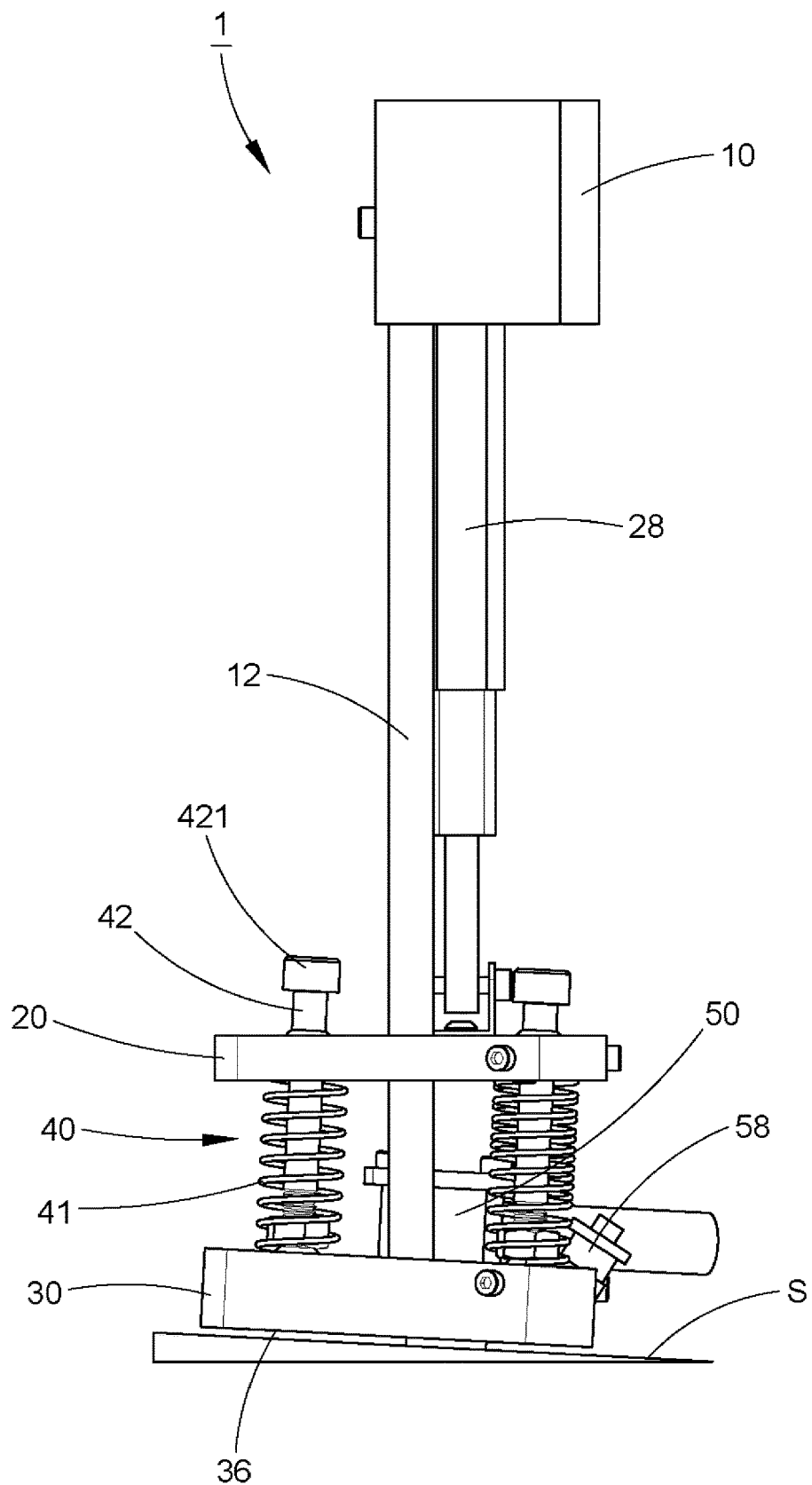
Figure 6:
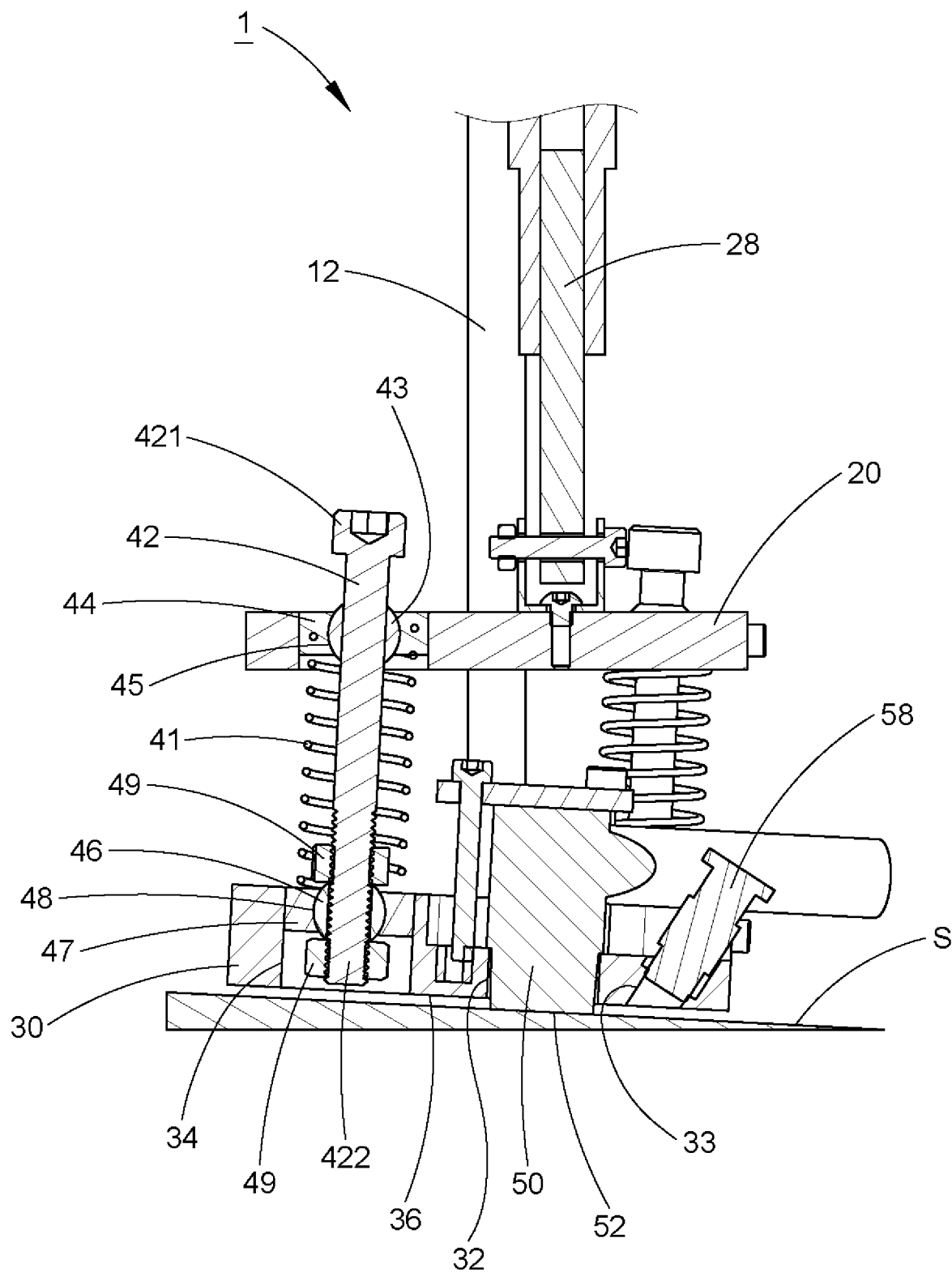
Figure 7:
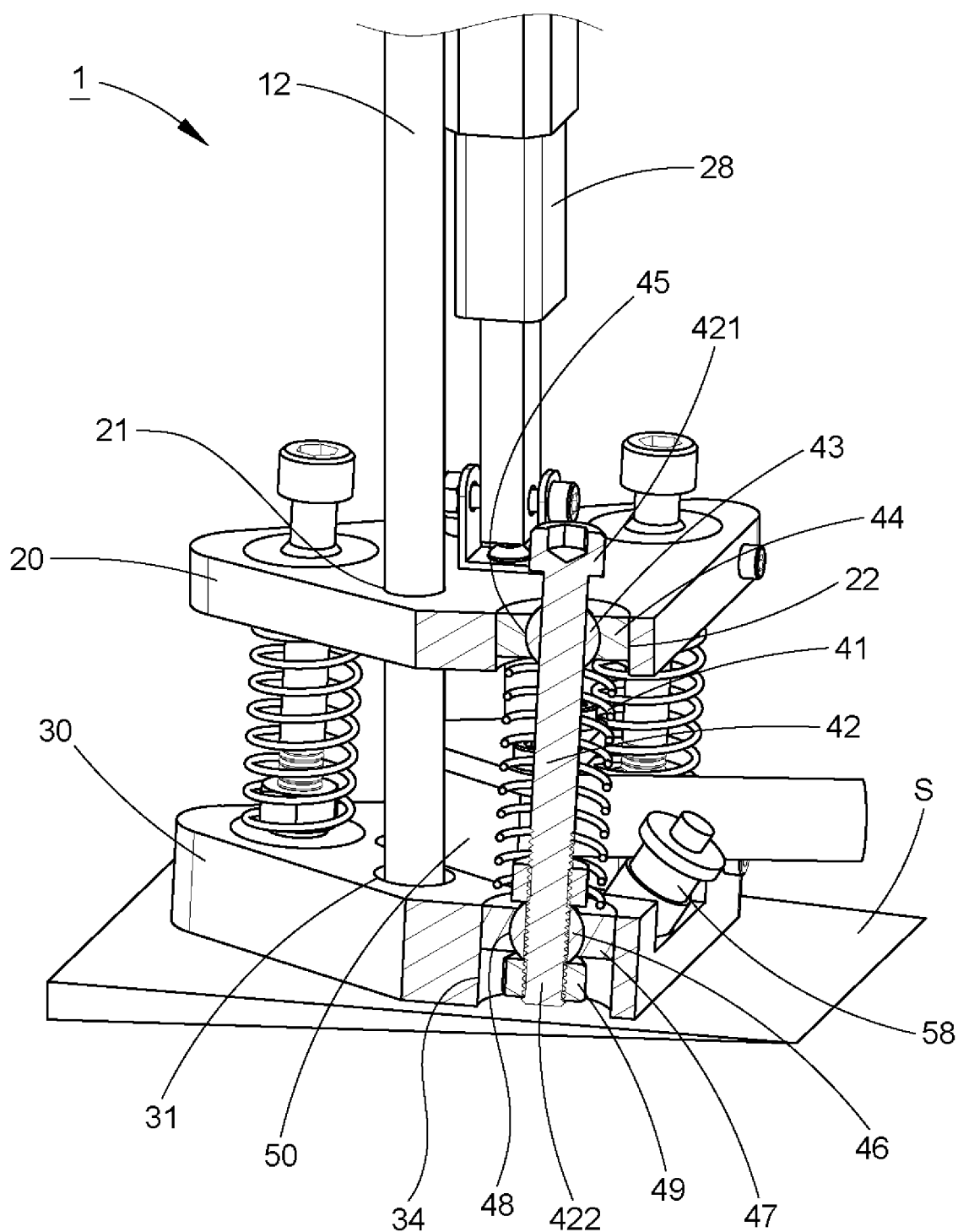

To operate the tank wall thickness inspecting module 1, as shown in FIG. 4, the actuator 28 first drives the slide 20 together with the buffer device 40 and the posture-adjustable seat 30 to move downward to an extent that the bottom ends of the two guide rails 12 are located inside the two guide holes 31, respectively. Then, as shown in FIGS. 5-7, the actuator 28 continuously drives the slide 20 to move downward to enable that the bottom surface 36 of the posture-adjustable seat 30 comes into contact with the surface S under inspection. Because the three shafts 42 can be driven by the posture-adjustable seat 30 to independently move upward and change angles relative to the slide 20, the posture-adjustable seat 30 can automatically adjust its angle in response to the irregularity of the surface S under inspection. Further, the rebounding forces of the three elastic members 41 will force the posture-adjustable seat 30 to press on the surface S under inspection. In other words, since the buffer device 40 allows the posture-adjustable seat 30 to change its distance and angle relative to the slide 20, the posture-adjustable seat 30 can automatically adjust its angle to ensure that the detection surface 52 of the probe 50 can be positively contacted with the surface S under inspection. This allows the probe 50 to accurately detect the wall thickness and addresses the deficiency that the probe structures of prior art cannot adjust angle thereof in accordance the irregularity of the surface under inspection, thereby achieving the objectives of the present invention.

Based on the above-mentioned technical features, various modifications to the structure of the tank wall thickness inspecting module 1 may be made. For example, a linear bearing may be further provided between the slide 20 and each of the two guide rails 12 to reduce friction. The buffer device 40 may be replaced by other equivalent mechanisms, e.g., by simply connecting the slide 20 and the posture-adjustable seat 30 with three elastic members 41 and thus omitting the three shafts 42. Furthermore, the nozzle 58 is used to spray water onto the surface S under inspection to facilitate the detection of the probe 50; however, the nozzle 58 may be installed to the posture-adjustable seat 30 by other ways or even omitted. Such variations are not to be regarded as a departure from the scope of the invention, and all such modifications as would be obvious to one skilled in the art are intended to be included within the scope of the following claims.

What is claimed is:

1. A tank wall thickness inspecting module, comprising:
a base mount;
two guide rails extending from the base mount and being parallel to each other;
a slide slidably connected with the two guide rails;
an actuator having two ends respectively connected with the base mount and the slide to drive the slide to move along the two guide rails;
a posture-adjustable seat having two guide holes, through which the two guide rails extend;
a buffer device disposed between the slide and the posture-adjustable seat to enable that the posture-adjustable seat changes a distance and an angle thereof relative to the slide; and
a probe disposed with the posture-adjustable seat and provided with a detection surface; the detection surface being flush with a bottom surface of the posture-adjustable seat or protruding out of the bottom surface of the posture-adjustable seat.

2. The tank wall thickness inspecting module as claimed in claim 1, wherein the buffer device comprises three elastic members; each of the three elastic members has two ends connected with the slide and the posture-adjustable seat, respectively.

3. The tank wall thickness inspecting module as claimed in claim 2, wherein the buffer device further comprises three shafts passing through the three elastic members, respectively; each of the three shafts is connected with the slide by a first universal joint and with the posture-adjustable seat by a second universal joint in a way that the each of the three shafts is axially moveable relative to the first universal joint.

4. The tank wall thickness inspecting module as claimed in claim 3, wherein each of the first universal joints is rotatably sleeved thereon with a first bushing that is inserted into a first accommodating hole of the slide; each of the second universal joints is rotatably sleeved thereon with a second bushing that is inserted into a second accommodating hole of the posture-adjustable seat.

5. The tank wall thickness inspecting module as claimed in claim 4, wherein each of the first bushings includes an inner wall having a first ball engagement surface contacted with an outer periphery of one of the first universal joints; each of the second bushings includes an inner wall having a second ball engagement surface contacted with an outer periphery of one of the second universal joints.

6. The tank wall thickness inspecting module as claimed in claim 3, wherein each of the three shafts is threaded thereon with two nuts in a way that one of the second universal joints is sandwiched between the two nuts to prevent the three shafts from moving relative to the second universal joints respectively.

7. The tank wall thickness inspecting module as claimed in claim 3, wherein each of the three shafts is provided with a stop portion stopped against one of the first universal joints, such that the three shafts are prevented from escape from the first universal joints respectively.

8. The tank wall thickness inspecting module as claimed in claim 1, wherein each of the guide rails is inserted through one of the guide holes in a way that a gap is left between the guide rail and the guide hole.

9. The tank wall thickness inspecting module as claimed in claim 1, wherein the posture-adjustable seat comprises a mounting hole in which the probe is partially mounted.

10. The tank wall thickness inspecting module as claimed in claim 1, further comprising a nozzle mounted to the posture-adjustable seat.

11. The tank wall thickness inspecting module as claimed in claim 10, wherein the posture-adjustable seat comprises an inclined hole located adjacent to the probe; the nozzle is partially mounted in the inclined hole.

* * * * *